Figure 1:
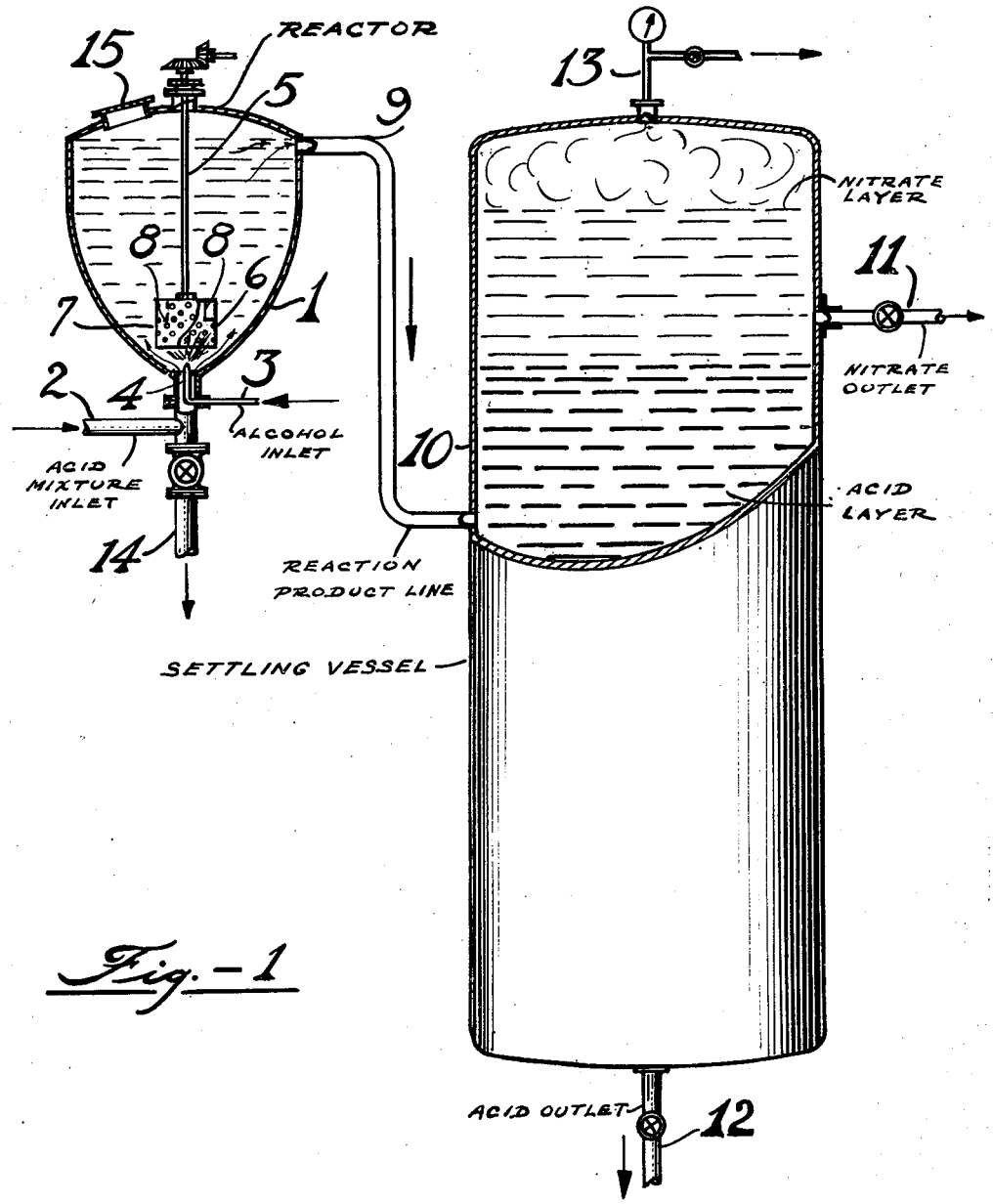

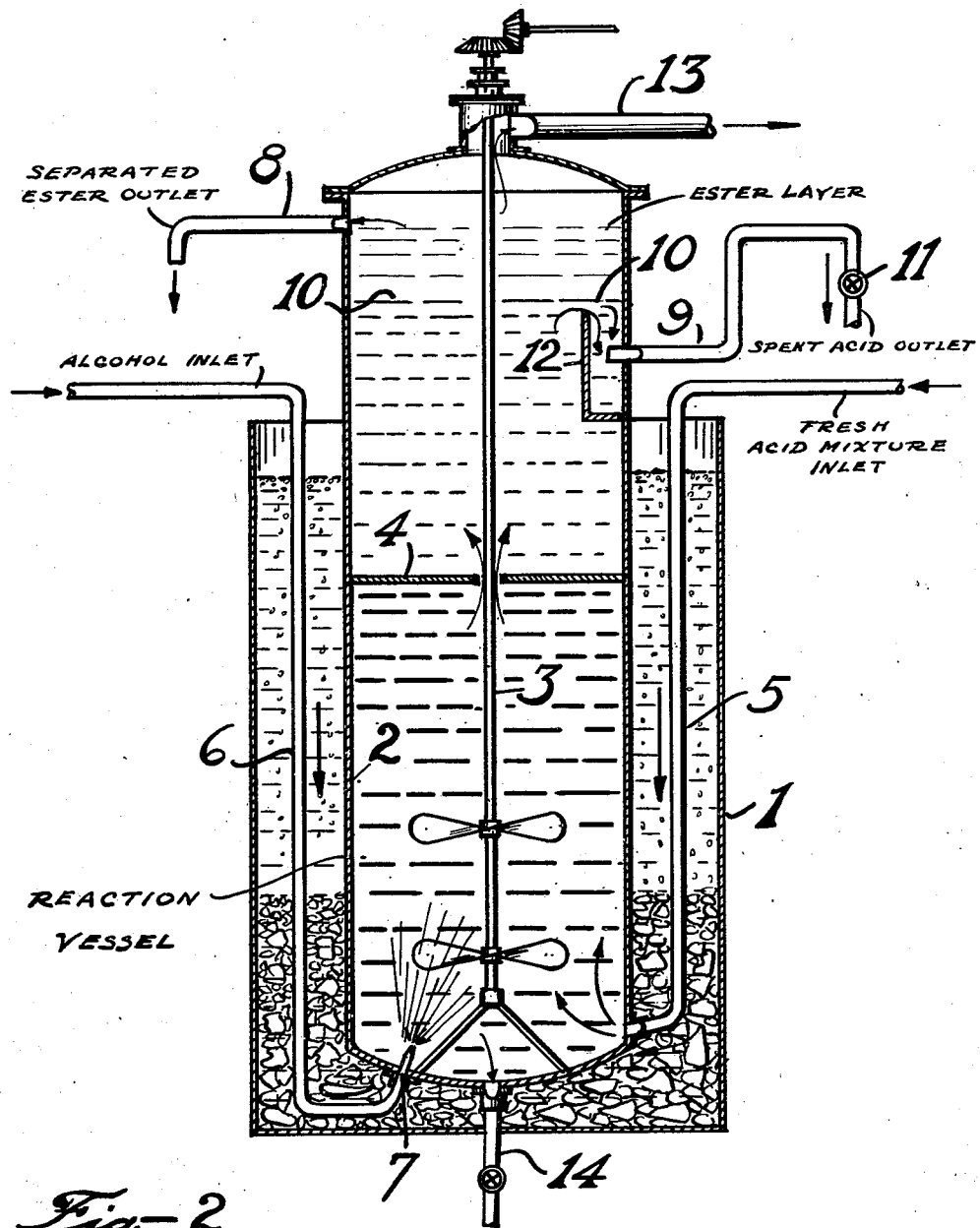

Patented Sept. 2, 1941

2,254,352

UNITED STATES PATENT OFFICE 2,254,352

PROCESS FOR THE MANUFACTURE OF ALKYL NITRATES

Gould H. Cloud, Elizabeth, and William J. Sparks, Cranford, N. J., assignors to Standard Oil Development Company Application December 8, 1937, Serial No. 178,690

13 Claims. (Cl. 260—467)

This invention relates to a new process for the manufacture of alkyl nitrates and it has particular relation to an efficient process for the manufacture of secondary alkyl nitrates by the nitration of secondary alcohols, olefines or other compounds containing a secondary alkyl radical.

There is little published information on the production of secondary organic nitrates. These compounds are notably difficult to form, on account of the violence of the esterification reactions and on account of the tendency for the products to decompose or polymerize. Bertoni (Gazzetta, 20, 372-6; Brit. Chem. Abs., 60 I, 163-4 (1891)) describes a method for the production of secondary butyl nitrate which consists in adding, drop by drop, secondary butyl alcohol to a mixture of two parts of sulfuric acid and one part of nitric acid maintained at a temperature below 0° C. Attempts to prepare secondary butyl nitrate and isopropyl nitrate by this method, in which temperatures only a few degrees below 0° C. were used, and in which the alcohol in the form of drops of the usual size (about $\frac{1}{20}$ c. c.) was dropped upon the surface of the acid mixture, showed, however, that a yield of only about 16% of ester, based on the quantity of alcohol used, could be obtained; and attempts to prepare several of the higher secondary nitrates by this method resulted in complete failure.

It is an object of the present invention to provide a method whereby a wide range of secondary alkyl nitrates may be obtained in high yields. It is a further object of the invention to provide a safe and continuous process for the production of such esters, and it is a still further object to provide for prompt and efficient separation of the product from the acid to prevent its further reaction with the acid mixture.

An essential feature of the invention consists in the employment of a reaction temperature of approximately $-10°$ C. It has been found that at temperatures substantially above $-10°$ C., even between $-10°$ C. and $0°$ C., yields are greatly reduced due to decomposition or polymerization of the product. The reaction at such higher temperatures is predominantly one of oxidation, whereby oxides of nitrogen are produced. In order to maintain the low temperature in the immediate neighborhood of the reacting liquids, it is preferable to precool both of the reactants before bringing them into contact.

Another feature of the invention consists in the addition of the alcohol (or other reactant) to the acid in the form of very small droplets or spray, in order to prevent local over-heating at the point of contact with the acid, due to the energy of the reaction. This is preferably accomplished by allowing the alcohol to pass into an agitated body of acid through a fine jet, porous thimble, or other appropriate device located preferably beneath the surface of the acid. If a jet is used, it should be sufficiently narrow to form drops of liquid not more than $\frac{1}{100}$th c. c. in volume.

Another feature of the invention, and a further means of preventing local over-heating, consists in the use of an internal refrigerant, whereby a low boiling solvent is introduced with one of the reactants, for example, the alcohol. The boiling away of the solvent in the reaction zone tends to keep the temperature down.

Other features of the invention will be apparent from the detailed description which follows.

One specific method of carrying out the invention, which is given by way of illustration only, consists in reacting the materials in batches, the reaction taking place in a suitable vessel provided with a stirrer and surrounded by a cooling medium, such as a dry ice-alcohol mixture. A mixture of two volumes of concentrated sulfuric acid and one volume of concentrated nitric acid is placed in the vessel and cooled to approximately $-10°$ C. The material to be nitrated, which must be in liquid form, is precooled to approximately the same temperature and slowly added to the surface of the acid through a thistle tube ending in a fine jet or admitted below the surface of the acid through a fine jet, while stirring the acid mixture vigorously. A volume of alcohol approximately equal to the volume of the nitric acid used is added and the stirring continued until reaction is complete, the stirring is then discontinued and the reaction mixture allowed to stand, while cooling is maintained, until the nitrate formed has separated in a layer at the top. The acid and nitrate layers may then be drawn off separately. It is very important that the product be kept cold while in contact with the acid, and that it be removed as quickly as possible to prevent decomposition. Any nitrites present in the nitrate layer may be removed by washing with a urea solution; and any alcohol present may be removed by extracting with 85% phosphoric acid, in which the nitrates are insoluble. An experiment conducted according to the foregoing method, in which 25 cc. of secondary butyl alcohol were added over a period of 1½ hours to a mixture of 50 cc. of sulfuric acid and 25 cc. of nitric acid, resulted in a yield of 78% by weight of secondary butyl nitrate. Other experiments, conducted in a similar manner, using in each case the corresponding alcohol, gave substantially the same yields of isopropyl nitrate, secondary amyl nitrate, secondary hexyl nitrate, secondary heptyl nitrate and secondary octyl nitrate.

Another and more preferable embodiment of the invention consists of a process for continuous reaction and separation of the product. In this process, the acid and alcohol (or other reactant) are introduced together in the bottom of the reaction vessel, where rapid agitation is maintained, the alcohol being introduced into the acid in finely divided form, and the mixture after reaction is passed into a separating zone where the ester formed and the acid mixture are separated, for example, by gravity or by centrifugal force.

Referring to Figure 1 of the drawings, the acid mixture is slowly introduced into the closed reactor 1 by means of inlet tube 2. The alcohol is introduced as a fine stream into the flowing acid by means of tube 3, ending in jet 4 located within tube 2 near the entry of reactor 1. The amounts of acid and alcohol introduced are adjusted so that approximately one volume of alcohol and two volumes of acid are introduced at the same time. Thorough mixing of the reacting liquids is effected by means of a stirrer, which consists of a revolving shaft 5 and hollow cylinder 6 whose sides are perforated by numerous small holes 7. Baffles 8 may be provided in the interior of cylinder 6 to facilitate agitation. Cylinder 6 is so placed that the incoming liquid mixture passes directly into its interior and is thoroughly agitated and then thrown out of the cylinder through holes 7 by centrifugal force. The thoroughly mixed liquid passes upward in reactor 1 while reaction takes place, and the reaction products then pass by tube 9 to a settling vessel 10, where the nitrate formed separates by gravity as a layer above the acid layer, and is drawn off by outlet tube 11. The acid is gradually drawn off by an outlet valve 12 at the bottom of vessel 10, and at such a rate that the level of separation of the ester and acid layers remains fairly constant. Safety valve 13 provides for relief of any excess of pressure in vessel 10. Draw-off valve 14 provides for emptying and cleaning out of reactor 1 and safety lid 15 keeps the reactor normally closed but is easily lifted by an excess pressure due to the reaction getting beyond control. It is desirable that the volume of settling vessel 10 be at least ten times that of reactor 1. Satisfactory results may be obtained in the case of the reaction of an aliphatic alcohol containing not more than eight carbon atoms with a mixture of two parts of sulfuric acid and one part of nitric acid, when the rate of flow of liquids is such that a given portion of liquid remains approximately one minute within reactor 1 and at least 10 minutes within settling vessel 10. The temperature of reaction and settling is in all cases maintained at approximately −10° C. by surrounding the vessels with a suitable cooling medium or by providing adequate insulation. The sulfuric acid drawn off from vessel 10 may be reconditioned and reintroduced into the system.

A still further embodiment of the invention provides for continuous reaction and separation of the products by gravity or other means in the same vessel. This process can be understood from a description of the apparatus used. In Figure 2 of the drawings, which shows a suitable form of such an apparatus, a jacket 1, containing a cooling medium such as dry ice-alcohol mixture, surrounds a reaction vessel 2, which is fairly high relative to its width. A suitable stirrer 3 provides agitation, and a baffle 4 separates the zone of agitation and reaction below from the relatively quiet zone above where the product separates by gravity from the heavy acid mixture, without, however, interfering with the free movement of the liquid mixture from the lower to the upper region as reactants are added. Inlet tube 5 providing for the incoming fresh acid mixture, passes downwardly in contact with the cooling medium and enters the reaction vessel at or near its bottom. Inlet tube 6, providing for the incoming alcohol, likewise passes downwardly through the cooling medium and enters the bottom of the reaction vessel, ending in jet 7 inside the vessel. Overflow tube 8 is located near the top of reaction vessel 2 at the point where the separated ester is to be drawn off. Siphon tube 9, serving to draw off the spent acids, enters the reaction vessel at a point somewhat below level 10 which represents the plane of separation of the ester and the acid mixture. Valve 11 controls the outflow of the acids, permitting gravity separation and maintaining of the ester layer at a height sufficient to permit overflow of the ester through tube 8. A protecting wall 12 prevents droplets of ester rising from the reaction zone from being drawn off with the spent acid. For safety precaution, a wide tube 13 is extended from the top of the reaction vessel to a suitable trough, with or without water, which will permit the escape of the foaming mixture should the temperature become too high and the reaction get beyond control. Draw-off valve 14 provides for cleaning out of the reaction vessel when desired.

The operation of the apparatus is as follows:
The reaction vessel 2 is filled, at least to the level of baffle 4, with a mixture of nitric and sulfuric acids, preferably containing one part of the former and two parts of the latter. The vessel is surrounded by a cooling mixture and cooled to below −10° C. The stirrer is set in motion and acid mixture and alcohol are admitted by tubes 5 and 6, respectively, at such a rate that the temperature of the reaction mixture does not rise substantially above −10° C. The acid is preferably introduced at twice the volume rate of the alcohol. The jet 7 at the end of the alcohol inlet tube 6 serves to introduce the alcohol in finely divided form. As the reaction becomes complete, the mixture of product and spent acid rises above the baffle 4, due to the buoying effect of the incoming liquids below. Above the baffle the mixture is in a quiet zone where it separates by gravity, the ester rising to the top, where it is drawn off continuously through tube 8 as fresh acid and alcohol are admitted at the bottom. At the same time the spent acid in the layer below the ester layer is continuously drawn off through siphon tube 9, at a rate controlled by valve 11.

In the above examples the ratio of sulfuric acid and nitric acids may be varied, but it is preferable that the ratio of the former to the latter be approximately within the range 2:1 to 1:1.

In all of the above examples the method may be modified by using an internal refrigerant. The alcohol, for example, may be diluted with an inert solvent boiling at approximately −10° C., or lower, such as isobutane. Any tendency to local over-heating would be controlled by the boiling off of the solvent in the reaction zone. The solvent may, if desired, be recondensed and recycled for further use.

The method of the present invention is applicable not only to the nitration of the lower secondary aliphatic alcohols, but to the nitration of other secondary alcohols, including the normally solid high molecular weight alcohols, as well as liquid and gaseous olefines, either alone or when diluted with paraffin hydrocarbons, as in the case of gasolines derived from the cracking of petroleum products. In the case of the nitration of alcohols which would be solid at the reacting temperatures, it is necessary to dissolve them in a suitable inert solvent before passing into the acid mixture. Secondary nitrates may also be made, in accordance with this invention, by reacting a sulfuric acid extract of unsaturated hydrocarbons with nitric acid.

The present invention is not to be considered as limited by the various embodiments particularly described in this specification, nor by its use in the nitration of the compounds specifically enumerated, but solely by the terms of the appended claims, by which it is intended to claim all novelty inherent in the invention as broadly as the prior art permits.

What we claim is:

1. A process of preparing a secondary aliphatic nitrate which comprises reacting a mixture of nitric and sulfuric acids with a compound selected from the group consisting of secondary aliphatic alcohols and olefins of the type RCH=CHR', wherein R is an aliphatic radical and R' is a member selected from the group consisting of hydrogen and an aliphatic radical, at a temperature not substantially above $-10°$ C.

2. A process according to claim 1 in which both the reactants are separately precooled to a temperature not substantially above $-10°$ C. before being brought into contact.

3. A process according to claim 1 in which a liquid comprising the compound to be nitrated is introduced in finely divided form into the mixture of nitric and sulfuric acids, while vigorously agitating the latter.

4. A process according to claim 1 in which the compound to be nitrated is diluted with an inert solvent boiling at not substantially above $-10°$ C. before being introduced into the reaction zone.

5. A process of preparing a secondary alkyl nitrate which comprises reacting a mixture of nitric and sulfuric acids with a secondary alkyl monohydric alcohol at a temperature not substantially above $-10°$ C.

6. A process of preparing a secondary alkyl nitrate which comprises reacting a mixture consisting of substantially one to two parts of sulfuric acid and substantially one part of nitric acid with a secondary alkyl monohydric alcohol at a temperature not substantially above $-10°$ C., the alcohol being introduced into the acid in finely divided form.

7. A process according to claim 6, in which the secondary alkyl monohydric alcohol contains not more than eight carbon atoms.

8. A process according to claim 6, in which the secondary alkyl monohydric alcohol is secondary butyl alcohol.

9. A continuous process of preparing a secondary alkyl nitrate which comprises separately precooling the corresponding secondary alcohol and a mixture of substantially one to two parts of sulfuric acid and substantially one part of nitric acid to a temperature not substantially above $-10°$ C., passing the acid mixture and alcohol simultaneously into a reaction vessel, the alcohol being introduced into the acid in finely divided form, agitating the mixture rapidly during the reaction, passing the reaction products to a separation zone, separating the ester formed from the acid, and separately drawing off the ester and acid, while maintaining during the reaction and separation stages a temperature not substantially above $-10°$ C.

10. A process according to claim 9 applied to the preparation of secondary amyl nitrate.

11. A process according to claim 9 applied to the preparation of secondary butyl nitrate.

12. A process of preparing a secondary alkyl nitrate which comprises reacting a mixture of nitric and sulfuric acids with a secondary aliphatic monohydric alcohol at a temperature not substantially above $-10°$ C.

13. A process of preparing a secondary alkyl nitrate which comprises reacting a mixture consisting of substantially one to two parts of sulfuric acid and substantially one part of nitric acid with a secondary aliphatic alcohol at a temperature not substantially above $-10°$ C., the alcohol being introduced into the acid in finely divided form.

GOULD H. CLOUD.
WILLIAM J. SPARKS.